(12) United States Patent
Leiber et al.

(10) Patent No.: US 7,152,569 B2
(45) Date of Patent: Dec. 26, 2006

(54) LUBRICATION OIL SUPPLY FOR CRANKSHAFT

(75) Inventors: Stephan Leiber, Marchtrenk (AT); Robert Kindl, Gunskirchen (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 244 days.

(21) Appl. No.: 10/879,685

(22) Filed: Jun. 30, 2004

(65) Prior Publication Data

US 2005/0016491 A1    Jan. 27, 2005

Related U.S. Application Data

(60) Provisional application No. 60/483,113, filed on Jun. 30, 2003.

(51) Int. Cl.
*F01M 1/00* (2006.01)

(52) U.S. Cl. ............... 123/196 R; 184/6.5; 123/90.33

(58) Field of Classification Search ............ 123/196 R, 123/197.4, 90.33; 184/6.5
See application file for complete search history.

(56) References Cited

U.S. PATENT DOCUMENTS

| | | | |
|---|---|---|---|
| 2,983,335 A * | 5/1961 | Etchells et al. ............... 184/6.9 |
| 3,309,941 A | 3/1967 | Kappel |
| 4,969,430 A * | 11/1990 | Masuda ................... 123/196 R |
| 5,685,266 A * | 11/1997 | Hudson ................... 123/196 R |
| 6,681,737 B1 * | 1/2004 | Shinoda et al. ......... 123/196 R |
| 6,807,936 B1 * | 10/2004 | Burger et al. ............ 123/196 R |
| 2004/0123830 A1 | 7/2004 | Koenigs et al. |

FOREIGN PATENT DOCUMENTS

| | | |
|---|---|---|
| AT | 404496 B | 11/1998 |
| DE | 248221 | 4/1910 |
| DE | 302557 | 10/1915 |
| DE | 355265 | 7/1920 |
| DE | 355265 C | 6/1922 |
| DE | 492112 | 2/1930 |
| DE | 844370 | 5/1952 |
| DE | 19921893 A | 11/2001 |
| FR | 913176 | 5/1946 |
| FR | 2718203 A | 10/1995 |
| GB | 189028 A | 11/1922 |
| GB | 2086532 A | 5/1982 |
| JP | 60-162435 | 8/1985 |
| JP | 60-209615 | 9/1985 |
| JP | 1-135911 | 5/1989 |
| JP | 02-257216 | 9/1990 |

(Continued)

OTHER PUBLICATIONS

European Search Report, European Patent Application:EP04015315, Date of Publication:May 1, 2005.

*Primary Examiner*—Tony M. Argenbright
*Assistant Examiner*—Katrina Harris
(74) *Attorney, Agent, or Firm*—Osler, Hoskin & Harcourt LLP

(57) ABSTRACT

An engine crankshaft includes a split crankshaft journal that includes offset connecting rod journals for two connecting rods. Oil supply systems disposed on opposite axial sides of the crankshaft journal each lubricate a corresponding one of the connecting rod journals. The oil supply systems are either axial or peripheral oil supply systems that do not require oil to be supplied to the crankshaft through the main crankcase bearings. Consequently, the oil supply systems sufficiently lubricate each connecting rod journal without requiring weakening holes or grooves in the main crankcase bearings.

17 Claims, 2 Drawing Sheets

| | FOREIGN PATENT DOCUMENTS | | SE | 121166 | 10/1926 |
|----|----|----|----|----|----|
| JP | 04-214220 | 8/1992 | | | |
| SE | 73955 | 2/1917 | * cited by examiner | | |

LUBRICATION OIL SUPPLY FOR CRANKSHAFT

CROSS REFERENCE TO RELATED APPLICATIONS

This invention relates to and claims priority from the U.S. provisional application Ser. No. 60/483,113, filed Jun. 30, 2003, the contents of which are incorporated herein in their entirety.

BACKGROUND OF THE INVENTION

1. Field of the Invention

This invention relates to systems for lubricating bearings on an engine crankshaft.

2. Description of Related Art

The present invention relates to a crankshaft with at least one crankshaft journal for at least one connecting rod with at least two main bearing journals for supporting the crankshaft within a crankcase, and with two lubricating oil drillings in the crankshaft from which lateral drillings in the crankshaft journals and in the plain bearings that are associated with the main bearing journals carry lubricating oil to the plain bearings.

It is generally known that in order to supply a crank mechanism with lubricant, the crankshaft main bearings are supplied with lubricating oil by way of the crankcase. In most instances, the connecting rod bearings on the crankshaft journals are then supplied with lubricating oil from the main bearings through drillings that originate from the main bearings; these drillings extend obliquely through the crankshaft to the crankshaft journals. Drillings that originate from the main bearing journals and open out in a central drilling in the crankshaft that extend along the axis of rotation of the crankshaft can also be used as oil-supply channels. The various crankshaft bearings are therefore supplied with oil that flows into the crankshaft from the main bearing journals.

For example, it is known from DE 355 265 that the crankshaft journals can be supplied with lubricant from each two adjacent main bearing journals, or the lubricant can be routed from one main bearing journal to another by way of the crankshaft journals. To this end, two drillings that are disposed at an obtuse angle to one another are provided in the crankshaft journal, each of said drillings discharging into a central channel on the axis of the crankshaft journal. These drillings proceed from opposite face ends of a crankshaft journal. A chamber is formed in the area where the two drillings intersect, and a plain bearing associated with the crankshaft journal is supplied with lubricant from this chamber.

DE 844 370 A describes a crankshaft that is supplied with lubricant by way of a lubricant supply line that is coaxial with the axis of rotation of the crankshaft. The lubricant is routed to the individual main bearings and crankshaft bearings through a lubricant channel that is formed from the crankshaft. CH 73 955 A discloses a crankshaft, of which one end main bearing journal is extended such that the oil supply for the crankshaft is effected from a distributor that surrounds the extension piece. When this is done, the lubricant is routed to the lubricating oil channel in the crankshaft by way of a drilling that extends radially to the axis of rotation.

One major disadvantage in the prior art is that the main bearing is made weaker by the drillings and grooves in the crankcase, main bearings, and main bearing journals that are used to supply lubricating oil. This means that the bearings must be made stronger, and this entails a considerable weight penalty. In addition, it is difficult to supply lubricant to a lubricant channel in the crankshaft through the main bearing because the centrifugal forces acting on the lubricant act against the direction in which the lubricant is supplied, particularly at high engine speeds, which means that it is difficult to ensure reliable lubrication of all the bearing points. This problem applies particularly to high speed engines such as many internal combustion engines used for motorcycles or other recreational vehicles (personal watercraft, all-terrain vehicles, sport boats, karts, snowmobiles, outboard engines, aircraft, etc.).

Supplying a sufficient oil to the various crankshaft bearings becomes even more difficult when two connecting rods are installed on a single crankshaft journal because is it frequently difficult or impossible to drill an oil feel line between the two connecting rod journals of the crankshaft journal. The problem is amplified if the connecting rods are rotationally offset from one another, with respect to the crankshaft axis (rotational axis of crankshaft), such that the crankshaft journal is split into two portions (e.g., as is sometimes applied to V-type engines, for instance to two-cylinder V-type engines). FIGS. 2 and 3 illustrate a conventional crankshaft 100 that includes a split crankshaft journal 101 that includes two rotationally offset connecting rod journals 102, 103. As shown in FIG. 2, it is often impossible or unfeasible to drill oil feed line connections between the two connecting rod journals 102, 103 of the split crankshaft journal 101. In the absence of a fluid connection between the two connecting rod journals, the two connecting rod journals 102, 103 and bearings must each be supplied with lubricant from separate adjacent main bearing journals. As discussed above, however, supplying oil through additional main bearing journals and bearings significantly reduces the strength of the main bearing journals, the crankcase, and the main bearings, which must include holes, channels, and/or grooves to supply oil to the crankshaft.

SUMMARY OF THE INVENTION

Accordingly, one aspect of one or more embodiments of this invention provides a crankshaft lubrication system that significantly strengthens the crankcase, bearings, and crankshaft.

Another aspect of one or more embodiments of this invention provides a crankshaft that avoids one or more of the above-identified disadvantages in the prior art in a simple, cost-effective manner.

Another aspect of one or more embodiments of this invention provides a crankshaft lubrication system that improves the distribution of lubrication to the crankshaft bearings.

Another aspect of one or more embodiments of this invention provides a crankshaft lubrication system that eliminates the need to provide distributor grooves in the crankcase main bearings, as is conventionally required to provide oil to a crankshaft via the main crankcase bearing journals. Consequently, the crankcase main bearings according to one or more embodiments of the present invention are not substantially weakened, and can withstand much greater loads.

Another aspect of one or more embodiments of this invention provides a crankshaft that includes oil supply systems on opposite sides of a split crankshaft journal. Each oil supply system supplies oil to one of the two connecting rod journals on the split crankshaft journal. Neither of the two oil supply systems supply oil to the split crankshaft journal from the main bearing journals, which strengthens the main bearing journals.

Another aspect of one or more embodiments of this invention provides a crankshaft that includes a crankshaft body defining first and second ends and a rotational axis. The crankshaft also includes a crankshaft journal defined on the crankshaft body, the crankshaft journal being configured to rotationally support a connecting rod. The crankshaft also includes a first main bearing journal defined on the crankshaft body between the first end and the crankshaft journal, the first main bearing journal being configured to permit rotation of the crankshaft body within a crankcase. The crankshaft also includes a second main bearing journal defined on the crankshaft body between the second end and the crankshaft journal, the second main bearing journal being configured to permit rotation of the crankshaft body within a crankcase. The crankshaft also includes a first lubrication inlet positioned on the crankshaft and extending radially inwardly from a first peripheral surface of the crankshaft, the first lubrication inlet and the crankshaft journal being disposed on opposite sides of the first main bearing journal. The crankshaft also includes a second lubrication inlet positioned on the crankshaft, the second lubrication inlet and the crankshaft journal being disposed on opposite sides of the second main bearing journal. The crankshaft also includes a first lubrication outlet positioned at the crankshaft journal, a second lubrication outlet positioned at the crankshaft journal, a first lubrication channel defined by the crankshaft body and extending at least from the first lubrication inlet to the first lubrication outlet, and a second lubrication channel defined by the crankshaft body and extending at least from the second lubrication inlet to the second lubrication outlet.

According to a further aspect of one or more of these embodiments, the crankshaft includes a third lubrication outlet positioned at the first main bearing journal and fluidly connected to the first lubrication inlet via the first lubrication channel, and a fourth lubrication outlet positioned at the second main bearing journal and fluidly connected to the second lubrication inlet via the second lubrication channel.

According to a further aspect of one or more of these embodiments, the second lubrication inlet extends axially inwardly from the second end of the crankshaft body.

According to a further aspect of one or more of these embodiments, the second lubrication inlet extends radially inwardly from a second peripheral surface of the crankshaft body.

According to a further aspect of one or more of these embodiments, a diameter of the crankshaft body at least one of the first and second lubrication inlets is smaller than a diameter of the crankshaft body at least one of the main bearing journals.

According to a further aspect of one or more of these embodiments, the crankshaft journal comprises first and second connecting rod journals that are configured to rotationally support first and second connecting rods, respectively. The first lubrication outlet is configured and shaped to lubricate the first connecting rod journal. The second lubrication outlet is configured and shaped to lubricate the second connecting rod journal. The first and second connecting rod journals may be rotationally offset from each other.

According to further aspects of one or more of these embodiments, the first and second lubrication channels may or may not fluidly connect to each other within the crankshaft.

According to a further aspect of one or more of these embodiments, the first and second lubrication outlets comprise a single lubrication outlet disposed at the crankshaft journal. The single lubrication outlet fluidly connects to both of the lubrication inlets via the first and second lubrication channels, respectively.

Another aspect of one or more embodiments of the present invention provides a crankshaft that includes a crankshaft body defining first and second ends and a rotational axis. The crankshaft further includes a crankshaft journal defined on the crankshaft body, the crankshaft journal being configured to rotationally support a connecting rod. The crankshaft further includes a first main bearing journal defined on the crankshaft body between the first end and the crankshaft journal, the first main bearing journal being configured to permit rotation of the crankshaft body within a crankcase. The crankshaft further includes a second main bearing journal defined on the crankshaft body between the second end and the crankshaft journal, the second main bearing journal being configured to permit rotation of the crankshaft body within a crankcase. The crankshaft further includes a reduced diameter region defined on the crankshaft body between the first main bearing journal and the first end, the reduced diameter region having a diameter smaller than a diameter of at least one of the first and second main bearing journals. The crankshaft further includes a lubrication inlet positioned at the reduced diameter region and extending radially inwardly from a peripheral surface of the reduced diameter region. The crankshaft further includes a first lubrication outlet positioned at the crankshaft journal, a lubrication channel defined by the crankshaft body and extending at least from the lubrication inlet to the first lubrication outlet, and a second lubrication outlet positioned at the first main bearing journal and fluidly connected to the lubrication inlet via the lubrication channel.

According to a further aspect of one or more of these embodiments, the reduced diameter region is cylindrical. An annular groove may be disposed in the peripheral surface in the area of the first lubrication inlet.

According to a further aspect of one or more of these embodiments, the crankshaft is combined with a lubrication distributor that circumferentially surrounds the peripheral surface, the lubrication distributor being shaped and configured to connect to a lubrication supply to provide lubrication to the lubrication channel via the lubrication inlet. The combination may also include O-ring seals disposed on the peripheral surface on opposing axial sides of the lubrication inlet, the O-ring seals discouraging lubrication from escaping from the distributor or lubrication inlet.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which from a part of this original disclosure.

DETAILED DESCRIPTION OF PREFERRED EMBODIMENTS

Figure 1:
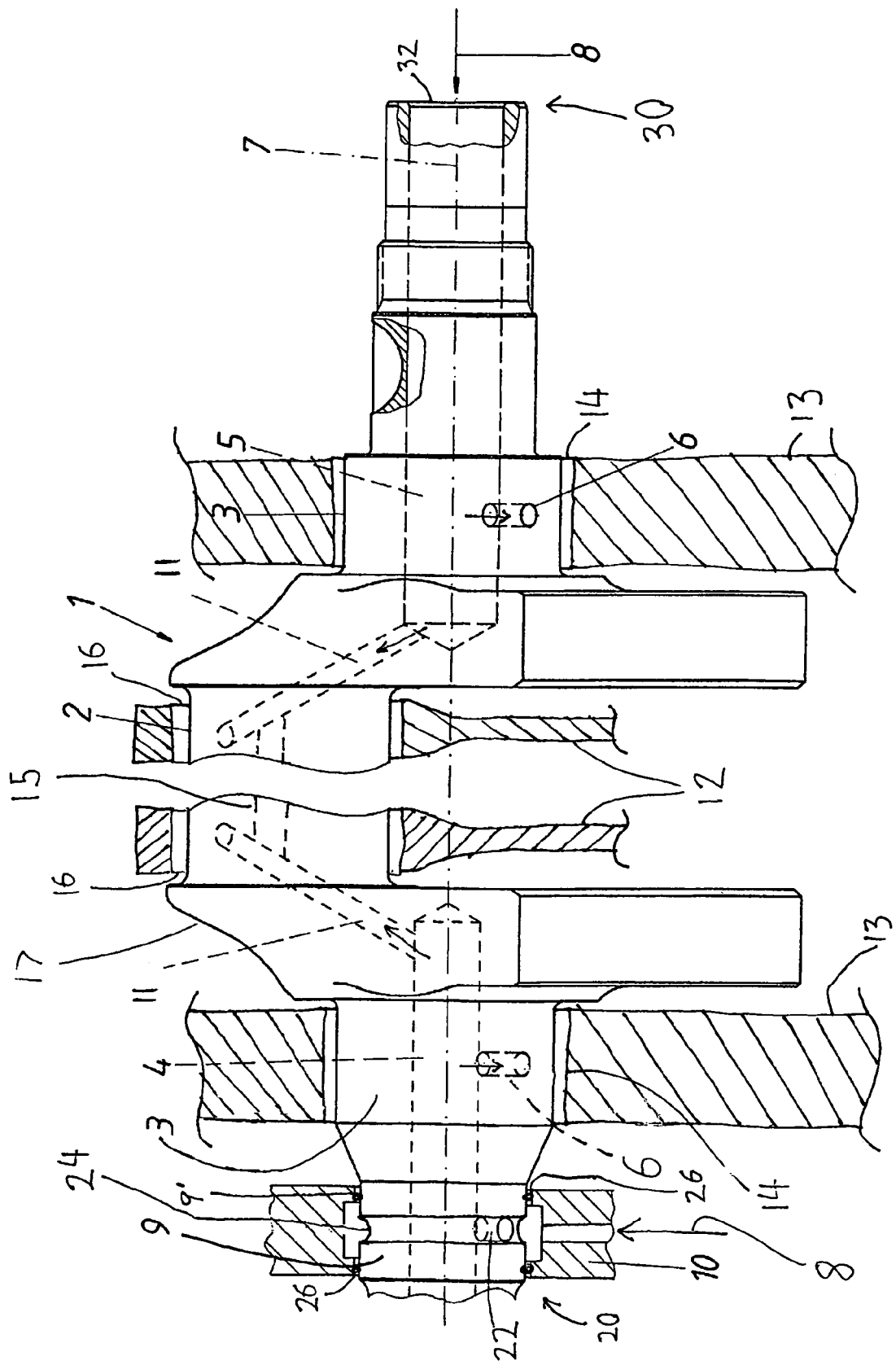
FIG. 1 is partial side view of an engine according to an embodiment of the present invention.
Figure 2:
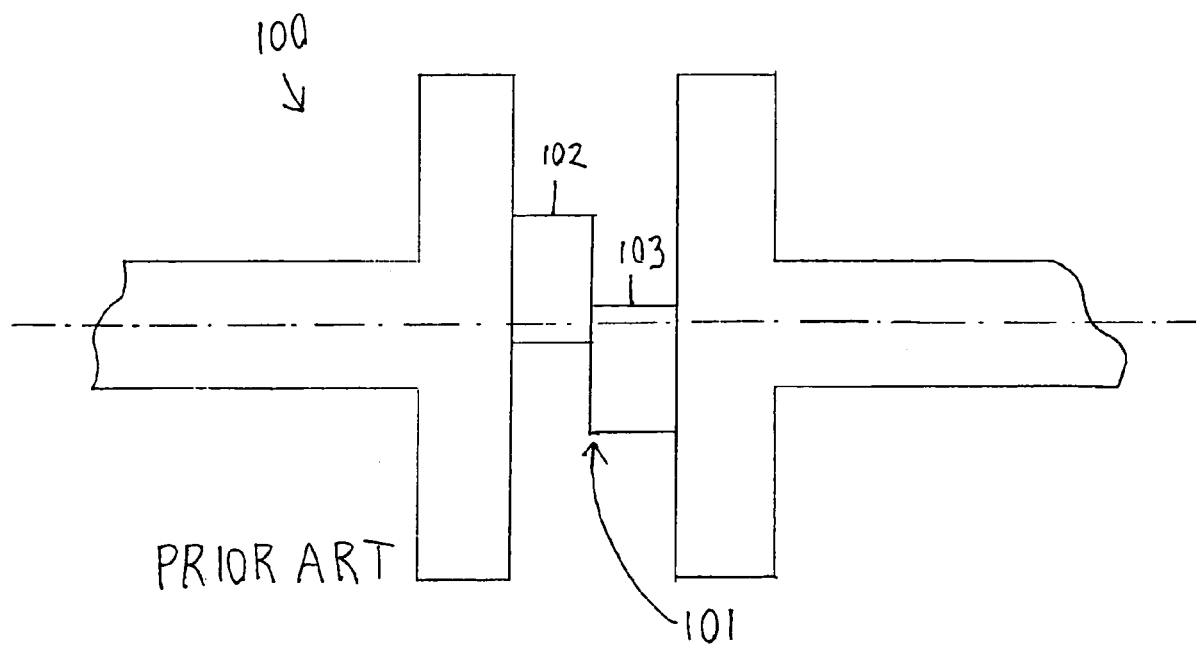
FIG. 2 is a partial top view of a conventional crankshaft with a split crankshaft journal.
Figure 3:
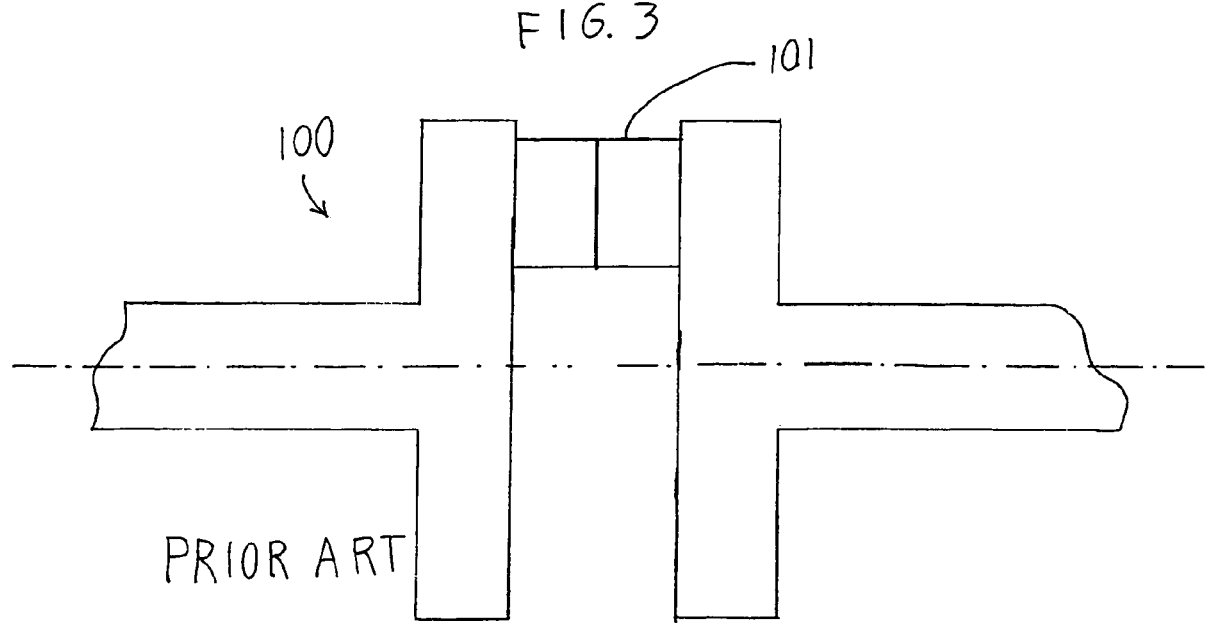
FIG. 3 is a partial side view of the crankshaft of FIG. 2.

FIG. 1 partially illustrates an engine according to an embodiment of the present invention. The engine includes a crankshaft 1 that is rotationally supported by a crankcase 13. The crankshaft 1 comprises a crankshaft body 17 that includes a crankshaft journal 2. The crankshaft journal includes two connecting rod journals for two connecting rods 12. The crankshaft 1 also includes two main crankcase bearing journals 3 that support the crankshaft 1 in a crankcase 13. The crankshaft 1 further includes two lubricating oil channels 4, 5 in the crankshaft 1.

The lubricating oil channels 4, 5 are coaxial with an axis of rotation 7 of the crankshaft 1. The lubricating oil channel 4 is disposed on an opposite side of the crankshaft journal 2 from the lubricating oil channel 5.

Main crankcase bearing lubrication outlets 6 extend radially outwardly from the lubricating oil channels 4, 5 to the main bearing journals 3 to supply crankcase bearings 14 with lubricating oil.

Crankshaft lubrication outlets 11 extend radially outwardly from the lubricating oil channels 4, 5 to the crankshaft journal 2 to supply the crankshaft journal 2, connecting rods 12, and connecting rod plain bearings 16 with oil. Each connecting rod 12 is preferably lubricated by a separate lubricating oil channel 4, 5 such that the lubricating oil channels and oil supply 8 ensure that the individual connecting rods 12 and associated connecting rod journals and bearings 16 are adequately and evenly lubricated. Accordingly, the crankshaft lubrication outlets 11 need not be fluidly connected to each other within the crankshaft 1. Alternatively, as illustrated in FIG. 1, a linking channel 15 may extend between the crankshaft lubrication outlets 11 to equalize pressure in the crankshaft lubrication outlets 11 and the lubricating oil channels 4, 5 to ensure that both connecting rods 12 are adequately and generally evenly lubricated.

The separate crankshaft lubrication outlets 11 may be combined into a single crankshaft lubrication outlet without deviating from the scope of the present invention. Such a single lubrication outlet could comprise a single drilling that connects to either lubrication channel 4, 5 or to the linking channel 15, which fluidly connects the lubrication channels 4, 5 to each other.

The lubricating oil channel 4 is supplied with oil by a peripheral oil supply system 20. Conversely, the lubricating oil channel 5 is supplied with oil by an axial oil supply system 30. The oil supply system 20 is disposed on an opposite side of the crankshaft journal 2 and crankshaft 1 as the oil supply system 30.

The peripheral oil supply system 20 comprises an oil inlet 22 and an oil distributor 10. The oil inlet 22 extends radially inwardly from a peripheral surface 9' of a reduced diameter region 9 of the crankshaft 1 to the lubricating oil channel 4. The oil distributor 10 circumferentially surrounds the peripheral surface 9' in the area of the oil inlet 22. The distributor 10 connects the oil supply 8 to the oil inlet 22 to provide the lubricating oil channel 4 with oil. An annular groove 24 is formed in the peripheral surface 9' in the area of the oil inlet 22 to improve the fluid connection between the oil inlet 22 and oil distributor 10 over the whole rotational range of the crankshaft 1. O-rings 26 are disposed between the peripheral surface 9' and the oil distributor 10 on either side of the oil inlet 22 to seal the oil distributor 10 and oil inlet 22 to maintain oil pressure therein and discourage oil from leaking into the crankcase 13.

As illustrated in FIG. 1, the peripheral surface is cylindrical and has a diameter that is smaller than the diameter of the main bearing journals 3. The smaller diameter improves oil distribution in the crankshaft 1 by reducing the centrifugal force that acts on the oil in a direction that is opposite to the flow of oil into the lubricating oil channel 4. The smaller diameter, therefore, improves oil distribution relative to prior art lubrication system that introduce oil through larger diameter main bearing journals.

The peripheral oil supply system 20 strengthens the crankcase 13, crankshaft 1, and crankcase bearings 14 relative to conventional engines that weaken these components by providing holes and/or grooves therein to supply oil to the crankshaft from the main bearing journals. The comparable inlet 22 and groove 24 in the peripheral oil supply system 20, on the other hand, do not disadvantageously weaken the engine because the distributor 10 bears only a very limited load of the crankshaft 1. According to a preferred embodiment of the invention the distributor 10 need not bear any considerable load of the crankshaft 1. Instead, the crankshaft load is borne by the main bearing journals 3 that are disposed adjacent to or axially spaced from the peripheral oil supply system 20. The peripheral oil supply system 20 may merely allow the torque generated by the crankshaft 1 to be transmitted through the region 9 to an end of the crankshaft 1. According to another preferred embodiment of the present invention the distributor 10 serves as a stabilizing support for the crankshaft 1.

The axial oil supply system 30 comprises an axially aligned oil inlet 32 that is defined by the lubricating oil channel 5. The oil inlet 32 is coaxial with the axis 7 and extends axially inwardly from an reduced diameter axial end of the crankshaft 1 to fluidly connect the oil supply 8 to the lubricating oil channel 5. The axial oil supply system 30 eliminates the conventional need to extend an oil supply line through the main bearing journals, which weakens conventional engines as described above.

The engine is preferably a V2 engine and the crankshaft journal 2 is preferably a split journal that includes rotationally-offset connecting rod journals for the connecting rods 12. The peripheral oil supply system 20 and lubricating oil channel 4 lubricates one of the connecting rods while the axial oil supply system 30 and lubricating oil channel 5 lubricates the other connecting rod 12. Accordingly, the offset connecting rods 12 and associated journals on the crankshaft journal 2 are adequately lubricated even if the split journal 2 prevents an oil feed line like the linking channel 15 from extending between the two connecting rod journals.

While the illustrated crankshaft 1 utilizes one peripheral lubrication system 20 and one axial lubrication system 30 to provide oil to the crankshaft 1, the axial lubrication system 30 may be replaced by a peripheral lubrication system 20 and vice versa without deviating from the intended scope of the present invention.

For example, a crankshaft that utilizes two peripheral oil supply systems 20 is particularly well suited for use in engines that have power takeoffs at both ends of the crankshaft. However axial lubrication systems 30 have proven to be efficient and may be applied in cases where the end of the crankshaft is not used for power take off purposes.

A crankshaft that utilizes at least one peripheral oil supply system 20 is particularly well suited for use in engines that include a power takeoff at one end of the crankshaft. For example, a flywheel or an alternator may be installed at an end of the crankshaft that includes the peripheral oil supply system 20.

Either of the oil supply systems 20, 30 may be omitted without deviating from the scope of the present invention.

In the illustrated embodiment, both oil supply systems 20, 30 provide oil from the oil supply 8 to the crankshaft 1. Alternatively, either oil supply system 20, 30 could be a return oil supply system that discharges oil from the crankshaft 1 back to the oil supply system. In such an embodiment, oil would flow into one side of the crankshaft 1 via one of the oil supply systems 20, 30, through the crankshaft 1, and out of the crankshaft via the other oil supply system 20, 30.

Embodiments of this invention are particularly useful when applied to a V-type engine, in particular to a two-cylinder V-type engine.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A crankshaft comprising:
    a crankshaft body defining first and second ends and a rotational axis;
    a crankshaft journal defined on the crankshaft body, the crankshaft journal being configured to rotationally support a connecting rod;
    a first main bearing journal defined on the crankshaft body between the first end and the crankshaft journal, the first main bearing journal being configured to permit rotation of the crankshaft body within a crankcase;
    a second main bearing journal defined on the crankshaft body between the second end and the crankshaft journal, the second main bearing journal being configured to permit rotation of the crankshaft body within a crankcase;
    a first lubrication inlet positioned on the crankshaft and extending radially inwardly from a first peripheral surface of the crankshaft, the first lubrication inlet and the crankshaft journal being disposed on opposite sides of the first main bearing journal;
    a second lubrication inlet positioned on the crankshaft, the second lubrication inlet and the crankshaft journal being disposed on opposite sides of the second main bearing journal;
    a first lubrication outlet positioned at the crankshaft journal;
    a second lubrication outlet positioned at the crankshaft journal;
    a first lubrication channel defined by the crankshaft body and extending at least from the first lubrication inlet to the first lubrication outlet; and
    a second lubrication channel defined by the crankshaft body and extending at least from the second lubrication inlet to the second lubrication outlet.

2. The crankshaft of claim 1, wherein the second lubrication inlet extends axially inwardly from the second end of the crankshaft body.

3. The crankshaft of claim 1, wherein the second lubrication inlet extends radially inwardly from a second peripheral surface of the crankshaft body.

4. The crankshaft of claim 1, wherein a diameter of the crankshaft body at at least one of the first and second lubrication inlets is smaller than a diameter of the crankshaft body at at least one of the first and second main bearing journals.

5. The crankshaft of claim 1, wherein a diameter of the crankshaft body at the first lubrication inlet is smaller than a diameter of the crankshaft body at the first main bearing journal.

6. The crankshaft of claim 1, wherein the first and second lubrication outlets comprise a single lubrication outlet.

7. The crankshaft of claim 1, further comprising:
    a third lubrication outlet positioned at the first main bearing journal and fluidly connected to the first lubrication inlet via the first lubrication channel; and
    a fourth lubrication outlet positioned at the second main bearing journal and fluidly connected to the second lubrication inlet via the second lubrication channel.

8. The crankshaft of claim 1, wherein the crankshaft journal comprises first and second connecting rod journals that are configured to rotationally support first and second connecting rods, respectively,
    wherein the first lubrication outlet is configured and shaped to lubricate the first connecting rod journal, and
    wherein the second lubrication outlet is configured and shaped to lubricate the second connecting rod journal.

9. The crankshaft of claim 8, wherein the first and second connecting rod journals are rotationally offset from each other.

10. The crankshaft of claim 8, wherein the first and second lubrication channels do not fluidly connect to each other within the crankshaft.

11. The crankshaft of claim 1, wherein the first and second lubrication channels do not fluidly connect to each other within the crankshaft.

12. The crankshaft of claim 1, wherein the first and second lubrication channels fluidly connect to each other within the crankshaft.

13. A crankshaft comprising:
    a crankshaft body defining first and second ends and a rotational axis;
    a crankshaft journal defined on the crankshaft body, the crankshaft journal being configured to rotationally support a connecting rod;
    a first main bearing journal defined on the crankshaft body between the first end and the crankshaft journal, the first main bearing journal being configured to permit rotation of the crankshaft body within a crankcase;
    a second main bearing journal defined on the crankshaft body between the second end and the crankshaft journal, the second main bearing journal being configured to permit rotation of the crankshaft body within a crankcase;
    a reduced diameter region defined on the crankshaft body between the first main bearing journal and the first end, the reduced diameter region having a diameter smaller than a diameter of at least one of the first and the second main bearing journals;
    a lubrication inlet positioned at the reduced diameter region and extending radially inwardly from a peripheral surface of the reduced diameter region;
    a first lubrication outlet positioned at the crankshaft journal;
    a lubrication channel defined by the crankshaft body and extending at least from the lubrication inlet to the first lubrication outlet; and
    a second lubrication outlet positioned at the first main bearing journal and fluidly connected to the lubrication inlet via the lubrication channel.

14. The crankshaft of claim 13, wherein the reduced diameter region is cylindrical.

15. The crankshaft of claim 13, further comprising an annular groove disposed in the peripheral surface in the area of the first lubrication inlet.

16. The crankshaft of claim 13 in combination with a lubrication distributor that circumferentially surrounds the peripheral surface, the lubrication distributor being shaped and configured to connect to a lubrication supply to provide lubrication to the lubrication channel via the lubrication inlet.

17. The combination of claim 16, further comprising O-ring seals disposed on the peripheral surface on opposing axial sides of the lubrication inlet, the O-ring seals discouraging lubrication from escaping from the distributor or lubrication inlet.

* * * * *